United States Patent Office 3,225,042
Patented Dec. 21, 1965

3,225,042
HYDROXYMORPHOLINES
Robert D. Dillard and Nelson R. Easton, Indianapolis,
Ind., assignors to Eli Lilly and Company, Indianapolis,
Ind., a corporation of Indiana
No Drawing. Filed July 31, 1962, Ser. No. 213,581
1 Claim. (Cl. 260—247.7)

This invention relates to novel hydroxymorpholines and to processes for their manufacture.

The compounds provided by this invention can be represented by the following formula:

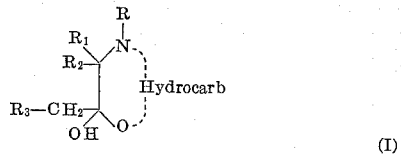

(I)

wherein R represents a member of the group consisting of hydrogen, $C_1$–$C_{12}$ alkyl, $C_2$–$C_{12}$ alkenyl, cycloalkyl, cycloalkenyl, aromatic radicals, substituted aromatic radicals, aralkyl, hydroxyalkyl, and alkoxyalkyl; $R_1$ and $R_2$, when taken separately, represent a member of the group consisting of $C_1$–$C_{12}$ alkyl, $C_2$–$C_{12}$ alkenyl, cycloalkyl, cycloalkenyl, alkoxyalkyl, aromatic radicals, and substituted aromatic radicals; $R_1$ and $R_2$, when taken together with the carbon atom to which they are attached, represent a member of the group consisting of polycyclic aromatic radicals, partially hydrogenated polycyclic aromatic radicals, cycloalkyl, and cycloalkenyl; $R_3$ is a member of the group consisting of halogen, lower alkyl, and hydrogen; and Hydrocarb is a two-carbon linking group selected from the group consisting of:

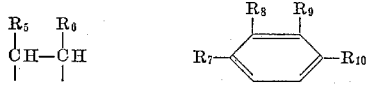

wherein $R_5$ and $R_6$, when taken separately, represent members of the group consisting of hydrogen, $C_1$–$C_{12}$ alkyl, $C_2$–$C_{12}$ alkenyl, aromatic radicals, substituted aromatic radicals, cycloalkyl, cycloalkenyl, aminoalkyl, lower alkylaminoalkyl, di-lower alkylaminoalkyl hydroxyalkyl, aralkyl, and alkoxyalkyl; $R_5$ and $R_6$, when taken together with the carbon atoms to which they are attached, represent a member of the group consisting of cycloalkyl, and cycloalkenyl; and $R_7$, $R_8$, $R_9$, and $R_{10}$ each represent a member of the group consisting of hydrogen, halogen, lower alkoxy, lower alkyl, lower alkylamino, di-lower alkylamino, acylamino, hydoxy, and halogen-substituted lower alkyl. Also included within the scope of this invention are acid addition salts of the hydroxy-morpholines represented by the above formula.

The compounds of this invention are readily prepared by the following reaction sequence:

Reaction Scheme 1

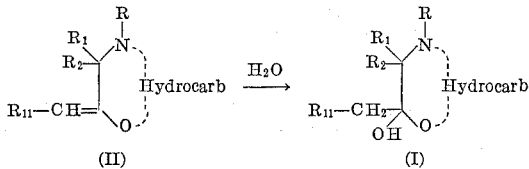

wherein R, $R_1$, $R_2$, and Hydrocarb have the same significance as hereinabove and $R_{11}$ is hydrogen or halogen. According to the above reaction scheme a methylene-morpholine is contacted with water, preferably in the form of a mixture with a water-miscible organic solvent, i.e., aqueous alcohol, aqueous acetone, etc. This hydration reaction usually takes place so readily that it is necessary to exercise considerable care in the preparation of the methylenemorpholines themselves to avoid the inadvertent synthesis of the hydroxymorpholines represented by Formula I above. In those instances where the hydration reaction proceeds slowly, catalytic quantities of an acid can be added to the hydration mixture in order to increase the rate of formation of the hydroxymorpholines.

Another useful and somewhat shorter overall procedure for preparing the hydroxymorpholines of this invention is represented in Reaction Scheme 2 below:

Reaction Scheme 2

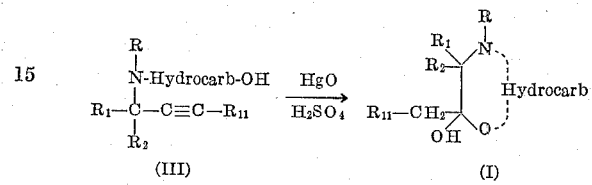

wherein R, $R_1$, $R_2$, $R_{11}$, and Hydrocarb have the same significance as hereinabove. According to Reaction Scheme 2, an aminoacetylene in which the amine group and the acetylene group are attached to the same fully substituted carbon atom and in which the amine group is further substituted with a hydrocarbyl linking group carrying a hydroxy group on a β-carbon atom, is simultaneously hydrated and cyclized to form the desired hydroxymorpholine. The preferred hydrating-cyclizing reagent is mercuric oxide in aqueous sulfuric acid. The aminoacetylene starting materials represented by Formula III above can be prepared in a variety of ways. The most readily available method of preparation involves the reaction of a secondary aminoacetylene with ethylene oxide. The secondary aminoacetylenes themselves are readily prepared by the reaction of a tertiary acetylenic halide of the formula:

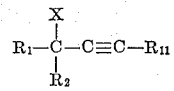

with a primary amine, R—$NH_2$, wherein $R_1$ and $R_2$ have the same meaning as hereinabove, X is a halogen, R is a non-aromatic hydrocarbon group and $R_{11}$ is hydrogen. (When $R_{11}$ represents halogen, the halogen is inserted into the molecule by standard procedures after the formation of the aminoacetylene.) The same procedure can be used to prepare compounds of Formula III directly by reaction of the above acetylene halide with a secondary amine of the formula R—NH—Hydrocarb—OH. The above procedure for preparing secondary and tertiary acetylenic amines is set forth in an article by Hennion and Easton, J. Am. Chem. Soc., 79, 2142 (1957), and an improvement in this process involving the use of a heavy metal catalyst, is set forth in the co-pending application of Nelson R. Easton et al., Serial No. 138,591, filed September 18, 1961, which improvement was subsequently disclosed in papers by Hennion et al., J. Am. Chem. Soc., 82, 4908 (1960), and by Easton et al., J. Org. Chem., 26, 3772 (1961). The improved process not only yields the above aminoacetylenes more rapidly, but also allows the preparation of aminoacetylenes represented by Formula III above wherein R is an aromatic group.

The methylenemorpholines which are employed as starting materials in Reaction Scheme I above are in turn produced by the cyclization of an aminoacetylene as represented by Formula III in the presence of base in an inert medium as set forth in the copending application of Easton and Dillard, Serial No. 213,614, filed this even date, which process was subsequently disclosed in a publication by Easton et al., J. Org. Chem., 28, 448 (1963).

The formation of the morpholine ring system under the hydrating-cyclizing conditions of Reaction Scheme 2 is quite unexpected since it has been found previously that β-hydroxyalkylaminoacetylenes, in which the amine and the acetylene functions are attached to the same carbon atom, cyclize to form a 5-membered oxazolidine ring instead of the 6-membered morpholine obtained by the process outlined in Reaction Scheme 2 above.

A still further preparative method is available for the synthesis of those compounds in which "Hydrocarb" represents a 2-carbon alkyl chain. This method is outlined in Reaction Scheme 3 below:

Reaction Scheme 3

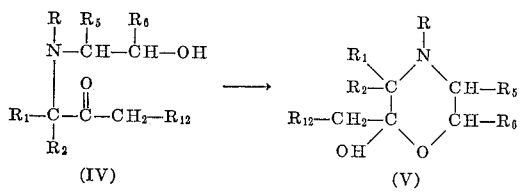

(IV)     (V)

wherein R, $R_1$, $R_2$, $R_5$, and $R_6$ have the same significance as hereinabove and $R_{12}$ is hydrogen, a lower alkyl. According to the above reaction scheme a hindered amino ketone (IV), in which the amine function is substituted with an alkyl grouping carrying a hydroxy group on its β-carbon atom, is treated with aqueous acid or is simply heated in an inert solvent, thereby affecting a ring closure to yield a hydroxymorpholine.

The hindered amino ketone starting materials represented by IV above when $R_{12}$ is hydrogen can be prepared as follows: A primary or secondary hindered aminoacetylene, as furnished by the method of Hennion, U.S. Patent 2,766,285, or Hennion, U.S. Patent 3,007,933, is hydrated by the procedure set forth in the copending application of Easton and Doran, Serial No. 44,004, filed July 20, 1960, now U.S. Patent 3,111,542, issued November 19, 1963. According to the procedure set forth in this patent, an aminoacetylene is treated with sulfuric acid and a catalytic quantity of mercuric oxide in aqueous methanol. The resulting amino ketone is then reacted with ethylene oxide or a substituted ethylene oxide, as for example styrene oxide, butadiene monoxide, and the like, to give a compound having a structure IV. Starting N-β-hydroxyethylaminno ketones (IV) in which $R_{12}$ is lower alkyl are prepared by the procedure set forth in the copending application of Nelson Easton, Serial No. 213,614, filed this even date. According to this procedure, an aminoacetylene carrying an acetyl group on the amine function is treated with an anhydrous acid to form an enol acetate which on treatment with aqueous acid yields the amino ketone as an acid addition salt. The amino ketone free base is prepared and, on treatment with an ethylene oxide, yields the desired starting material IV.

In the above Formulas I–V, when R, $R_1$, $R_2$, $R_5$, and $R_6$ are alkyl radicals having 1-12 carbon atoms, they can be illustratively methyl, ethyl, isopropyl, n-butyl, sec-butyl, n-amyl, t-amyl, 3-methylpentyl, 2-ethylhexyl, n-decyl, 6-ethyldecyl, neopentyl, and the like. When R, $R_1$, $R_2$, $R_5$, and $R_6$ represent alkenyl radicals having from 2-12 carbon atoms, they can be illustratively allyl, methallyl, crotyl, 2-pentenyl, 1-methyl-3-hexenyl, 3-ethyl-1-decenyl, undecenyl, iso-octenyl, and the like. When R, $R_1$, $R_2$, $R_5$, and $R_6$ represent aromatic radicals, they can be any of the ring systems fulfilling the usual criteria for aromaticity. Examples of such aromatic ring systems are, illustratively, phenyl, naphthyl, thienyl, furyl, pyridyl, pyrimidyl, and the like. Permissible substituents in these aromatic rings include halogens, such as chlorine, bromine, and fluorine, $C_1$–$C_5$ alkyl groups, such as methyl, ethyl, isopropyl, sec-butyl, t-butyl, n-amyl, iso-amyl, etc.; perhaloalkyl, amino, alkylamino, dialkylamino, acylamino, alkoxy, such as methoxy, ethoxy, propoxy, isopropoxy, n-butoxy; and the like. The alkyl substituent in the alkylamino and dialkylamino substituting groups can be the same or different radicals, such as methyl, ethyl, n-propyl, isobutyl, sec-butyl, n-amyl, and the like. When the amino group is substituted with an acyl group, the acyl groups can be illustratively aliphatic acyl radicals, such as acetyl, propionyl, acrylyl, capryl, and the like; aroyl radicals, such as benzoyl, chlorobenzoyl, ethylbenzoyl, furoyl, thenoyl, nicotinoyl, and the like; or arylsubstituted aliphatic acyl radicals, such as phenylacetyl, 3-phenylpropionyl, methoxyphenylacetyl, and the like. Illustrative aromatic or substituted aromatic radicals for R, $R_1$, $R_2$, $R_5$, and $R_6$ thus include naphthyl, phenyl, β-fluoronaphthyl, 2-chlorophenyl, 2-hydroxyfuryl, 2-dimethylaminopyridyl, 3-(2-methylbutyl)pyridyl, o-, m-, and p-bromophenyl, tolyl, o-isoamylphenyl, m-xylyl, p-iodophenyl, trifluoromethylphenyl, pentafluoroethylphenyl, trichloromethylphenyl, p-(n-hexyl)phenyl, p-ethoxyphenyl, p-dimethylaminophenyl, 2-isopropylpyridyl, fluoropenanthryl, nitrothienyl, 3-methylfuryl, anisyl, etc.

In the above formulas, when R, $R_1$, $R_2$, $R_5$, and $R_6$ represent cycloalkyl or cycloalkenyl radicals, they can be, illustratively, cyclobutyl, cyclopentyl, cyclohexyl, cycloheptyl, cyclo-octyl, methylcyclopentyl, ethylcyclohexyl, cyclobutenyl, cyclopentenyl, 3-butylcyclohexenyl, cycloheptenyl, cyclo-octenyl, and the like. When $R_1$ and $R_2$ are taken together with the carbon atom to which they are attached, they represent polycyclic aromatic, or partially-hydrogenated polycyclic aromatic radicals, illustratively, tetralinyl, indanyl, fluorenyl, dihydroanthranyl, thioxanthyl, xanthyl, dibenzocycloheptadienyl, or dibenzocycloheptatrienyl, and the like. $R_1$ and $R_2$ or $R_5$ and $R_6$, when taken together with the carbon atoms to which they are attached, can form a cycloalkyl or cycloalkenyl ring, such rings including cyclobutyl, cyclopentyl, cyclohexyl, cycloheptyl, cyclo-octyl, cyclobutenyl, cyclopentenyl, cyclohexenyl, cycloheptenyl, cyclo-octenyl, and the like, as well as alkyl-substituted cyclic rings. R, $R_5$, and $R_6$ can also represent an aralkyl radical, such as illustratively, benzyl, phenetyl, 2-phenylpropyl, 1-phenylethyl, 1-tolylethyl, m-chlorobenzyl, and the like, the permissible aromatic radicals substituted in the alkyl chain being, in general, those defined above for R, $R_1$, $R_2$, $R_5$, and $R_6$. When R, $R_1$, $R_2$, $R_5$, and $R_6$ represent alkoxyalkyl radicals, they can be illustratively, 12-methoxydodecyl, 3-methoxypropyl, ethoxyethyl, isopropoxyamyl, and the like. $R_5$ and $R_6$, when they represent aminoalkyl, lower alkylaminoalkyl, or di-lower alkylaminoalkyl groupings, can be, illustratively, 2-(dimethylamino)ethyl, 3-ethylaminopropyl, 2-ethylaminopropyl, methylaminomethyl, dimethylaminomethyl, and the like. $R_3$ and $R_{12}$ when they represent lower alkyl groups, can be illustratively, ethyl, methyl, n-propyl, isobutyl, sec-butyl, and the like. Among the halogens which $R_3$ and $R_{11}$ can represent are included chlorine, bromine, iodine, etc.

In the above formulas, the two-carbon linking groups, symbolized by the term "Hydrocarb" can be either an ethylene group optionally substituted on either carbon or a two-carbon linking group which forms part of an aromatic ring. When a hydroxyl group is attached directly to the Hydrocarb moiety in a position β to the amine group as in Formula III, illustrative groups which Hydrocarb-OH can represent include 2-hydroxyethyl, o-hydroxyphenyl, 2-hydroxy-1-methylethyl, o-hydroxythienyl, 2-hydroxybutyl, 2-hydroxy-2-phenylethyl, and the like.

Illustrative free bases included within the scope of this invention are as follows:

4-phenyl-2-methyl-2-hydroxy-3,3,5-trimethyl-3,4-dihydro-2H-1,4-benzoxazine 1-methyl-1-hydroxy-2-oxa-5-n-propyl-5-azaspiro[4.5]decane 4-(2-methoxyethyl)-2,3-dimethyl-3-isopropyl-2-hydroxymorpholine
4-benzyl-2,3-dimethyl-3-dodecyl-2-hydroxymorpholine
4-(4-chlorophenyl)-2,3-dimethyl-3-dodecenyl-2-hydroxymorpholine
4-undecyl-2,3-dimethyl-3-cyclopentylmethyl-2-hydroxymorpholine
4-cyclohexenyl-2,3-dimethyl-3-isopropyl-2-hydroxymorpholine
4-isopropyl-2,3-dimethyl-3-(2-methoxyethyl)-2-hydroxymorpholine
4-cyclohexylmethyl-2,3-dimethyl-3-isobutyl-2-hydroxymorpholine
4-(2-pyridyl)-2-methyl-3-ethyl-3-n-amyl-2-hydroxymorpholine
2,3,4-trimethyl-3-t-butyl-2-hydroxymorpholine
4-t-amyl-2,3,3-trimethyl-2-hydroxymorpholine
3,3,4-trimethyl-2-ethyl-2-hydroxymorpholine
2,3,3-trimethyl-2-(2-ethoxyethyl)-2-hydroxymorpholine The compounds of this invention are heavy viscous oils or low-melting solids. Those compounds which contain a basic amino group readily form acid addition salts and these acid addition salts are, in general, white crystalline solids. The acid addition salts are included within the scope of this invention and are useful in isolating the amine bases provided by this invention, as well as in formulating the amine bases for various uses.

The preparation of acid addition salts of these amines can be carried out as follows.: A solution of the amine is mixed with an equivalent of an acid, either as such or in solution. If the acid addition salt thus formed is insoluble in the solvent or solvents employed, it precipitates and is isolated by filtration or centrifugation. On the other hand, if the acid addition salt is soluble in the solvent employed, the acid addition salt is recovered in solid form by evaporation of the solvent. When an acid addition salt is formed with a gaseous acid, such as hydrogen chloride, an excess of the acid can be employed, since the excess can be readily removed by volatilization.

The preparation of a typical acid addition salt, specifically a hydrochloride salt, is carried out as follows: A solution of the hydroxymorpholine is prepared in anhydrous ether and an ethereal solution of hydrogen chloride is added thereto, the hydrogen chloride being in a quantity in excess of that needed to react with the number of equivalents of amine present. The amine hydrochloride is, in general, insoluble in the ethereal solution and is separated by filtration. The acid addition salts are satisfactorily purified by recrystallization from a mixture of anhydrous ethanol and ethyl acetate, although other solvents and solvent mixtures are equally operative.

Other acid addition salts, including the sulfates, phosphates, nitrates, hydrobromides, hydriodides, succinates, benzoates, acetates, maleates, tartrates, citrates, and the like, are prepared by following one of the general procedures outlined above.

The hydroxymorpholine compounds of this invention corresponding to Formula I above, either in the form of the free bases or as acid addition salts thereof, manifest valuable pharmacological antimicrobial action in standard laboratory tests. In particular, the compounds affect the central nervous system providing a useful stimulant action. In tests against selected animal pathogens, plant pathogens, material-degrading organisms, and other obnoxious micro-organisms, the compounds have a moderate-to-good inhibitory action.

In addition, the hydroxymorpholines of this invention are available as intermediates for the preparation of other related organic compounds by means of further reactions involving the tertiary hydroxyl group, i.e., replacement with halogen, esterification under carefully controlled conditions to avoid dehydration, etc.

The following examples illustrate the novel processes and compositions of this invention.

*Example 1.—Preparation of 4-ethyl-2,3,3,5-tetramethyl-2-hydroxymorpholine*

About 34 g. of N-ethyl-N-(2-hydroxypropyl)-3-amino-3-methyl-1-butyne were added in dropwise fashion to a mixture containing 30 g. of 18 M sulphuric acid, 2 g. of mercuric oxide, 30 ml. of methanol, and 30 ml. of water. The reaction mixture was heated at refluxing temperature for about 4 hours and was then filtered with the acid of 2 g. of cellulose fibers. The filtrate was decolorized with charcoal and was then made basic by the addition of an excess of 10 percent sodium hydroxide. The basic solution was extracted with ether. The ether extract was dried and the ether removed by evaporation in vacuo, leaving as a residue 4-ethyl-2,3,3,5-tetramethyl-2-hydroxymorpholine formed in the above reaction. Distillation of the residue yielded purified 4-ethyl-2,3,3,5-tetramethyl-2-hydroxymorpholine boiling at about 82° C. at a pressure of about 7 mm. of Hg; $n_D^{25}$=1.453. 4-ethyl-2,3,3,5-tetramethyl-2-hydroxymorpholine was converted to the corresponding hydrochloride salt by dissolving the free base in ethanol and adding an excess of ethanolic hydrogen chloride to the ethanolic solution. The evaporation of the solvents in vacuo yielded 4-ethyl-2,3,3,5-tetramethyl-2-hydroxymorpholine hydrochloride which melted at 182–184° C. after recrystallization from ethyl acetate.

*Analysis.*—Calc.: C, 53.68; H, 9.91; N, 6.26. Found: C, 53.91; H, 10.03; N, 5.97.

Following the same procedure N-ethyl-N-(2-hydroxy-2-phenylethyl)-3-amino-3-methyl-1-butyne was cyclized and hydrated in the presence of sulfuric acid, mercuric oxide, methanol, and water to yield 4-ethyl-2,3,3-trimethyl-6-phenyl-2-hydroxymorpholine which distilled in the range 112–8° C. at a pressure of about 0.08 mm. of Hg; $n_D^{25}$=1.517. The hydrochloride salt melted at 153–5° C.

Following the same procedure N-ethyl-N-(2-hydroxyethyl)-1-amino-1-ethinylcyclohexane was cyclized and hydrated in the presence of sulfuric acid, mercuric oxide, methanol, and water to yield 1-methyl-1-hydroxy-5-ethyl-2-oxa-5-azaspiro[5.5]undecane, which was recovered by the procedure of the same example. The free base was a solid which was crystallized from a mixture of ether and hexane. The corresponding hydrochloride salt was prepared by the method outlined above and melted in the range 145–50° C.

*Analysis.*—Calc.: C, 57.70; H, 9.69. Found: C, 57.82; H, 9.64.

*Example 2.—Preparation of 4-ethyl-2,3,3-trimethyl-2-hydroxymorpholine*

Thirty-four grams of 3-ethylamino-3-methyl-2-butanone and 13.2 g. of ethylene oxide were mixed with 400 ml. of ethanol, and the mixture was heated at about 50° C. for about 14 hours in an autoclave. The reaction mixture was distilled and N-ethyl-N-(2-hydroxyethyl)-3-amino-3-methyl-2-butanone formed in the above reaction was recovered, boiling in the range 92–4° C. at a pressure of about 10 mm. of Hg.

One gram of the above product was dissolved in ethyl acetate and gaseous anhydrous hydrogen chloride was passed into the solution, thus cyclizing the ketone to yield 4-ethyl-2,3,3-trimethyl-2-hydroxymorpholine in the form of its insoluble hydrochloride salt, which melted at about 175–7° C.

*Analysis.*—Calc.: C, 51.54; H, 9.61. Found: C, 51.46; H, 9.66.

The infrared absorption spectrum of this compound showed no carbonyl absorption and was consistent with a cyclic structure.

*Example 3.—Preparation of 2-hydroxy-2,3,3-trimethyl-4-(2-methoxyphenyl)morpholine*

Ten grams of N-(2-methoxyphenyl)-N-(2-hydroxyethyl)-3-amino-3-methyl-1-pentyne were added dropwise to 200 ml. of refluxing toluene containing 1 g. of potassium hydroxide. After the addition had been completed, the reaction mixture was refluxed an additional 90 minutes and was then cooled and filtered. The toluene was removed by evaporation in vacuo, leaving as a residue 4-(2-methoxyphenyl)-3,3-dimethyl-2-methylenemorpholine. Four grams of the residue were dissolved in 150 ml. of wet methyl ethyl ketone and gaseous hydrogen chloride was bubbled through the solution until an acidic reaction to litmus was obtained. The reaction mixture was stirred for about 16 hours at ambient room temperature, at the end of which time all of the solvents were removed by evaporation in vacuo. The residue comprising 2-hydroxy-2,3,3-trimethyl-4-(2-methoxyphenyl)morpholine hydrochloride formed in the above reaction was crystallized and recycrystallized from methyl ethyl ketone. The compound melted at about 144–146° C.

*Analysis.*—Calc.: C, 58.43; H, 7.71. Found: C, 58.63; H, 7.43.

The following compounds can be prepared by employing the above procedure to hydrate a methylenemorpholine as furnished by the procedure set forth in the copending application of Easton and Dillard, Serial No. 213,614:

4-ethyl-2,3,3-trimethyl-2-hydroxymorpholine
2,3,3,4-tetramethyl-2-hydroxymorpholine
4-phenethyl-2,3,3-trimethyl-2-hydroxymorpholine
4-ethyl-2,3,3-trimethyl-5-isopropoxymethyl-2-hydroxymorpholine
4-ethyl-2,3,3-trimethyl-6-allyloxy-2-hydroxymorpholine
4-ethyl-3,3-dimethyl-2-chloromethyl-2-hydroxymorpholine
4-ethyl-2,3,3-trimethyl-6-diethylaminoethyl-2-hydroxymorpholine
4-ethyl-2,3,3-trimethyl-6-hydroxymethyl-2-hydroxymorpholine
4-ethyl-2,3,3,6-tetramethyl-2-hydroxymorpholine
4-ethyl-2,3,3,5-tetramethyl-2-hydroxymorpholine
1-methyl-1-hydroxy-5-ethyl-2-oxa-5-azaspiro[5.5]undecane
4-ethyl-2,3,3-dimethyl-6-phenyl-2-hydroxymorpholine
4-ethyl-2,3,3-trimethyl-6-(4-chlorophenyl)-2-hydroxymorpholine
4-ethyl-2,3,3-trimethyl-6-(4-methoxyphenyl)-2-hydroxymorpholine
4-ethyl-2,3,3-trimethyl-6-(4-tolyl)-2-hydroxymorpholine
2,3,3,4-tetramethyl-6-phenyl-2-hydroxymorpholine
2,3,3-trimethyl-6-phenyl-2-hydroxymorpholine
4-(2-methoxyphenyl)-2,3,3-trimethyl-2-hydroxymorpholine
4-(tolyl)-2,3,3-trimethyl-2-hydroxymorpholine
4-(4-methyl-3-chlorophenyl)-2,3,3-trimethyl-2-hydroxymorpholine
4-ethyl-2,3,3-trimethyl-2-hydroxy-3,4-dihydro-2H-1,4-benzoxazine
4-(2-hydroxyethyl)-2,3,3-dimethyl-2-hydroxymorpholine

We claim:
The process of synthesizing a compound of the formula

$$\begin{array}{c} R \\ | \\ R_1 \diagdown N \diagdown \\ R_2 \diagup \quad \diagdown \text{Hydrocarb} \\ R_{11}-CH_2 \diagup \quad \diagup \\ | \quad \diagdown O \diagup \\ OH \end{array}$$

wherein
R is a member of the group consisting of hydrogen, $C_1$–$C_{12}$ hydrocarbyl, hydroxyalkyl, and alkoxyalkyl;
$R_1$ and $R_2$, when taken separately, are $C_1$–$C_{12}$ hydrocarbyl, and, when taken together with the carbon atom to which they are attached, are members of the group consisting of cycloalkyl and cycloalkenyl;
$R_{11}$ is a member of the group consisting of halogen and hydrogen; and
Hydrocarb is a two-carbon linking group free from acetylenic unsaturation, which comprises treating with mercuric oxide in aqueous sulfuric acid solution a compound represented by the following formula:

$$\begin{array}{c} R \\ | \\ N\text{-Hydrocarb-OH} \\ | \\ R_1-C-C \equiv C-R_{11} \\ | \\ R_2 \end{array}$$

wherein R, $R_1$, $R_2$, $R_{11}$, and Hydrocarb have the same significance as hereinabove.

References Cited by the Examiner
UNITED STATES PATENTS

| | | | |
|---|---|---|---|
| 2,364,347 | 12/1944 | Dickey et al. | 260—247 |
| 2,997,469 | 8/1961 | Heel et al. | 260—247.7 |

WALTER A. MODANCE, *Primary Examiner.*
NICHOLAS S. RIZZO, *Examiner.*